(12) United States Patent
Crocker

(10) Patent No.: US 10,883,232 B2
(45) Date of Patent: Jan. 5, 2021

(54) DEVICE FOR MELTING AND APPLYING THERMOPLASTIC MATERIAL TO SURFACE

(71) Applicant: Waterblasting, LLC, Stuart, FL (US)

(72) Inventor: James P Crocker, Stuart, FL (US)

(73) Assignee: Waterblasting, LLC, Stuart, FL (US)

( * ) Notice: Subject to any disclaimer, the term of this patent is extended or adjusted under 35 U.S.C. 154(b) by 192 days.

(21) Appl. No.: 14/796,876

(22) Filed: Jul. 10, 2015

(65) Prior Publication Data

US 2016/0032542 A1 Feb. 4, 2016

Related U.S. Application Data

(60) Provisional application No. 62/173,886, filed on Jun. 10, 2015, provisional application No. 62/113,187, (Continued)

(51) Int. Cl.
| | |
|---|---|
| *E01C 23/12* | (2006.01) |
| *E01C 23/20* | (2006.01) |
| *B29B 13/02* | (2006.01) |
| *E01C 19/08* | (2006.01) |
| *E01C 19/10* | (2006.01) |

(Continued)

(52) U.S. Cl.
CPC ............ *E01C 23/20* (2013.01); *B29B 13/022* (2013.01); *E01C 19/08* (2013.01); *E01C 19/1013* (2013.01); *E01C 19/16* (2013.01); *E01C 23/203* (2013.01); *E01C 23/222* (2013.01)

(58) Field of Classification Search
USPC ...................................... 404/92, 93; 118/110
See application file for complete search history.

(56) References Cited

U.S. PATENT DOCUMENTS 1,940,964 A * 12/1933 McIntyre ................ F28D 1/053
165/128
2,548,177 A * 4/1951 Tauber .................... E01C 19/08
126/343.5 A (Continued)

FOREIGN PATENT DOCUMENTS

GB       2087958     6/1982
WO   WO2013063297   5/2013

*Primary Examiner* — Thomas B Will
*Assistant Examiner* — Katherine J Chu
(74) *Attorney, Agent, or Firm* — McHale & Slavin, P.A.

(57) ABSTRACT

A pavement striping devices for heating and applying thermoplastic material to a road surface is provided. The pavement striping device includes of: a hopper for holding a supply of particulate thermoplastic marking material in a non-molten state, an air or oil-heat transfer medium melting kettle having a series of coaxial conveyored or unconveyored conduits within, a plastic extruder for transporting the thermoplastic particulate from the hopper to the series of coaxial conveyored or unconveyored conduits with the air or oil-heat transfer medium melting kettle, a heating mechanism for heating the air or oil-heat transfer medium melting kettle and the plastic extruder to a temperature suitable for melting thermoplastic, and a means for driving the stream of molten thermoplastic through the series of coaxial conveyored or unconveyored conduits to a sprayer or extrusion die, all of which form a means by which the molten thermoplastic is directed to the pavement surface.

6 Claims, 14 Drawing Sheets

Related U.S. Application Data filed on Feb. 6, 2015, provisional application No. 62/022,867, filed on Jul. 10, 2014.

(51) Int. Cl.
*E01C 19/16* (2006.01)
*E01C 23/22* (2006.01)

(56) References Cited

U.S. PATENT DOCUMENTS

| | | | | |
|---|---|---|---|---|
| 2,607,337 | A | * | 8/1952 | Miller ............... F23K 5/20 |
| | | | | 122/140.1 |
| 3,533,374 | A | * | 10/1970 | Luescher ........... A23G 1/18 |
| | | | | 118/20 |
| 3,554,449 | A | * | 1/1971 | Currie ............... E01C 23/20 |
| | | | | 118/302 |
| 3,966,508 | A | * | 6/1976 | Mohr ............... C02F 1/048 |
| | | | | 148/27 |
| 4,807,746 | A | * | 2/1989 | Jacobs ............... C10C 3/12 |
| | | | | 126/343.5 A |
| 4,850,425 | A | * | 7/1989 | Anderson ......... B29B 13/022 |
| | | | | 165/65 |
| 6,175,101 | B1 | * | 1/2001 | Miller ............... B29B 13/022 |
| | | | | 219/422 |
| 7,626,143 | B2 | * | 12/2009 | Miller ............... B05C 5/001 |
| | | | | 219/421 |
| 8,201,717 | B2 | * | 6/2012 | Varga ............... B05C 5/001 |
| | | | | 222/590 |
| 2004/0099212 | A1 | | 5/2004 | Dirienzo et al. |
| 2011/0081134 | A1 | * | 4/2011 | Salyer ............... C09K 5/063 |
| | | | | 392/308 |

* cited by examiner

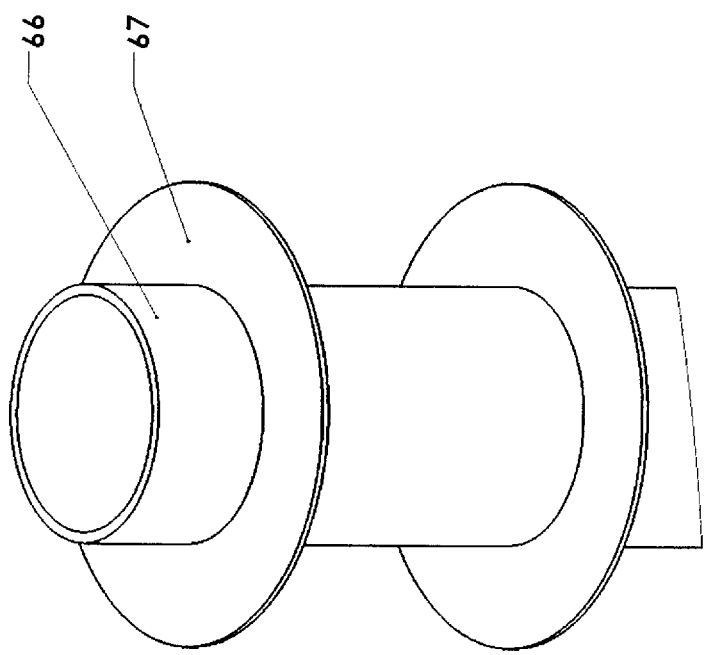

DEVICE FOR MELTING AND APPLYING THERMOPLASTIC MATERIAL TO SURFACE

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 62/022,867, entitled "DEVICE FOR MELTING AND APPLYING THERMOPLASTIC MATERIAL TO ROAD SURFACES", filed Jul. 10, 2014; U.S. Provisional Patent Application No. 62/113,187, entitled "DEVICE FOR MELTING AND APPLYING THERMOPLASTIC MATERIAL TO ROAD SURFACES", filed Feb. 6, 2015; and U.S. Provisional Patent Application No. 62/173,886, entitled "DEVICE FOR MELTING AND APPLYING THERMOPLASTIC MATERIAL TO ROAD SURFACES", filed Jun. 10, 2015. The contents of which the above referenced applications are incorporated herein by reference in its entirety.

FIELD OF THE INVENTION

This invention relates generally to the field of a road surface marking apparatus, and in particular to a device for heating and applying thermoplastic material to a road surface.

BACKGROUND OF THE INVENTION

In the United States, the first documented use of a painted center line was along Trenton's River Road in Wayne County, Mich., in 1911, when Edward N. Hines watched a leaky milk wagon leave a white trail along a road. A road surface marking is any kind of device or material applied to a road surface in order to convey official information. Typically, road surface markings are used on paved roadways to provide guidance information to both drivers and pedestrians. Marking uniformity is an important factor in minimizing confusion and uncertainty about their meaning, and efforts exist to standardize such markings.

Road surface markings vary in form: surface level permanently affixed, surface level temporarily but not permanently affixed, higher than road surface markers, and/or even mechanical devices. They are designed to inform motorist and pedestrians. Their designs range from merely a daytime or nighttime visual presentation to a raised pavement marker that advises motorist by light reflection or vehicle vibration resulting from contact between the vehicles tires and the raised marker. Efforts to improve road marking systems exist in the realm of the application of such markings, adding retro-reflectivity, increasing longevity, and lowering installation cost.

More specifically, two distinctions exist for road surface markings: mechanical and non-mechanical markings. Mechanical devices may be raised or recessed into the road surface, and either reflective or non-reflective. Most mechanical road surface markings are permanent; however, some are movable. Mechanical devices include, but are not limited to Botts' dots, rumble strips, and reflective markers. Botts' dots, low rounded white dots, generally are used to mark the edges of traffic lanes, frequently in conjunction with raised reflective markers. Rumble strips are typically a series of simple troughs that are ground into the asphalt. They can be used across the travel direction to warn of hazards ahead or along the travel direction to warn of hazards of not staying within a specific lane. They create a strong vibration when driven over in order to alert a driver to various upcoming hazards both by sound and the physical vibration of the vehicle. Reflective markers are used as travel lane dividers to mark the median or to mark exit slip-roads. By incorporating a raised retro-reflective element, they are typically more visible at night and in inclement weather than standard road marking lines.

Non-mechanical markings include, but are not limited to paint, thermo-set, tape, and thermoplastic pavement markings. Paint, which sometimes includes additives such as retro-reflective glass beads, is generally used to mark travel lanes, spaces in parking lots or special purpose spaces for disabled parking, loading zones, or time-restricted parking areas. Paint is a low-cost application, and is usually applied right after the road has been paved. The road is marked commonly by a truck called a "striper." These trucks typically contain hundreds of gallons of paint stored in huge drums which sit on the bed. The markings are controlled manually or automatically by a controller who sits on the truck bed. Paint is directed through a series of hoses under pressure and applied to the roadway surface along with the application of glass beads for retro-reflectivity. Painted symbols, such as turn-lane arrows or HOV lane markers, may be applied manually or using stencils.

Thermoplastic is one of the most common types of road surface marking based on its balance between cost and performance longevity. It is durable, easy to apply, and reflective. For low traffic areas, traffic paint is suitable and will last for a year or so. However, in higher traffic areas, paint simply cannot handle the wear and will disappear in just a few months. The longevity of thermoplastic makes it a very cost effective traffic delineation solution. Thus, the use of thermoplastics over paints has increased; mainly due to the performance benefits of increased durability, retro-reflectivity, and a lack of volatile organic compound (VOC) solvents. Furthermore, municipalities like these features because they can budget for a thermoplastic job once every several years instead of having to budget for paint striping every year or less.

Thermoplastic comes in a solid state, is environmentally friendly, and is a user safe compound. It combines a mixture of glass beads, pigments, binders, and filler materials. Its composition offers a variety of positive features: the glass beads provide the retro-reflectivity necessary for its bright night time appearance; pigments provide the color and opacity; the binder mixture provides toughness, flexibility, and bond strength while holding all the components together; and fillers, such as calcium carbonate, sand and/or other inert substances provide bulk.

Thermoplastic markings are applied using specially equipped trucks. The thermoplastic mix, usually in a brick or pellet form, is heated in the truck to about 400° F. (200° C.) before being fed to the application apparatus, which is often a screed box, spray dispenser, or ribbon gun. Temperature is the most important factor for the proper mixing, melting and bonding of thermoplastic. The thermoplastic mix is heated to a temperature between 400° F. and 440° F. and agitated, causing the thermoplastic compound to become a homogenized liquid. When applied at this temperature, the thermoplastic melts into the upper surface of the asphalt, forming a strong thermal bond. When installed on porous surfaces, such as open-graded asphalt or tined concrete, the hot liquid thermoplastic fills the voids, creating a strong mechanical lock on concrete.

The apparatus conventionally employed to apply thermoplastic marking material, known as a pavement striping apparatus, includes walk behind systems, systems that are pulled on trailers, or systems that are built on vehicle chassis. The pavement striping apparatus includes one or more large capacity melter hoppers or kettles that maintain a relatively large volume of thermoplastic marking material in a molten state. Such hoppers or kettles are typically oil-jacketed and diesel or propane fired, and can keep as much as 2,000 pounds or more of thermoplastic marking material in a molten state. Although this method is very effective, it does present certain drawbacks. For example, it takes a significant amount of time to melt the relatively large volume of thermoplastic marking material kept in the kettle. This can cause delays before the pavement marking operation can be commenced. It also takes a significant amount of energy to keep a relatively large volume, more than 2,000 pounds of thermoplastic marking material, in a molten state. For this reason, the apparatus conventionally employed to apply thermoplastic marking material to pavement surfaces further includes one or more "preheaters" that are used to melt an additional volume of thermoplastic marking material before it enters the melting kettles. Unfortunately, other drawbacks still exist.

Once melted, the thermoplastic marking material must be continuously stirred to keep the various components of the material from separating and to prevent the thermoplastic material from undergoing thermal degradation. Additionally, should the thermoplastic material remain in the kettle for too long, the material will begin to overheat and scorching may occur. Thermoplastic material that reaches and exceeds its flashpoint must be cooled rapidly for two reasons: firstly, superheated material can ignite causing serious consequences when exposed to air; and secondly, the thermoplastic can break down from the effects of this heat in a short time and thus become waste material. Overheated or super heated material in the kettle can be cooled by the addition of unheated material to the kettle, but material added to the kettle has a low efficiency of cooling.

In the case of heavy duty commercial equipment, pavement striping apparatus or systems are built on the chassis of large trucks and can include one or more large capacity melter kettles. Such kettles can be quite tall and provided with various structures, such as platform steps, ladder rungs, bridges, etc., which enable operators or tenders to access and charge material into the tops of the melter kettles. There is an inherent danger in a tender carrying large volumes of thermoplastic up a platform. The tender lifts or otherwise transfers plastic bags of granular thermoplastic material up to the melter kettle and introduces the material therein. The material free falls into the melter kettle in its packaged or solid state. Mechanical agitators in the melter kettle then mix the material. The opening at the top of the melter kettle into which the thermoplastic material is poured can be a hinged lid or any number of various designed chutes with baffle doors. The hinged lid offers the tender no protection against back splash of molten material or blow back of flames from super heated material. When the melter kettle lid is opened, while the thermoplastic is above its flashpoint temperature, oxygen is sucked into the melter kettle and may ignite with an explosive force. Serious injury to anyone in the vicinity of the blast can occur. Various designed baffle chutes offer some protection against splash back of material; however, blow back of flames from super heated material remains a constant danger. These hazards are serious deficiencies that need to be corrected. For this reason, a hopper system that is designed to store and easily dispense the material into the melting kettle has been introduced into some pavement striper devices in order to alleviate some of the drawbacks mentioned.

There are additional problems that can occur when material is fed into melter kettles. If the material is added in solid form, it will melt slowly. This is because only the relativity small mass of the surface area of the material is in contact with the heated walls and floor of the melter as well as the molten material in the kettle. The agitators in the kettles do not have the ability to break the solid material into smaller pieces. Thus, this material can only melt from its outer surface. This slow process increases both production time and job cost. Furthermore, if material is added into a hopper, only the material fed into the hopper is melted in the kettle, and only the molten material within the kettle can be dispensed onto a pavement surface, thus resulting in a lag time. For this reason, a real time operating system that feeds thermoplastic granular material into the kettle at a rate that is suitable to handle the demands of the dispensing system onto the pavement is needed.

Thus, what is lacking in the prior art are improvements to a pavement striping device for rapidly heating and applying thermoplastic material to a road surface in a continuous manner.

SUMMARY OF THE INVENTION

An improvement to surface marking devices for heating and applying thermoplastic material to various surfaces including roads, parking lots and the like is provided. The surface marking device is comprised of: a hopper for holding a supply of particulate thermoplastic marking material in a non-molten state, an air or oil-jacketed melting kettle having a series of coaxial conveyored or unconveyored conduits within, a plastic extruder for transporting the thermoplastic particulate from the hopper to the series of coaxial conveyored or unconveyored conduits with the air or oil jacketed melting kettle, a heating mechanism for heating the air or oil-jacketed melting kettle and the plastic extruder to a temperature suitable for melting thermoplastic, and a means for driving the stream of molten thermoplastic through the series of coaxial conveyored or unconveyored conduits to a sprayer or extrusion die, all of which form a means by which the molten thermoplastic is directed to the surface to be marked.

Thermoplastic particulate in a non-molten state is transported from a hopper through a plastic conveyor or extruder screw, whereby the thermoplastic particulate may begin a heating process by means of external heat or friction. The thermoplastic is thereafter fed into a series of coaxial positioned conduits within the air or heat transfer air or oil-jacketed melting kettle, whereby the thermoplastic flows or is driven therethrough with a conveyor and heated to a suitable melting temperature to reach a molten state. Finally, the molten thermoplastic is gravity fed or pumped through a sprayer or extrusion die by means that direct the molten thermoplastic to the pavement surface.

Accordingly, it is an objective of the present invention to provide a pavement striping device that provides real-time heating and melting of thermoplastic particulate for application to a road surface.

It is another objective of the present invention to provide a series of coaxial tubes within an oil-heat transfer medium melting kettle to provide a suitable volume of thermoplastic for continuous real time road marking.

It is yet another objective of the instant invention to provide a series of coaxial conduits, which may be provided in any suitable shape for melting and allowing the melted resin or plastic materials to flow through the conduits.

It is yet another objective of the instant invention to provide a series of coaxial conduits, each equipped with an auger or scraper that drives thermoplastic material through the coaxial tubes of the air or oil-heat transfer medium melting kettle.

A further objective of the present invention is to provide a screw conveyor for supplying the thermoplastic granules to the air or oil heated melting kettle.

It is a further objective of the present invention to provide two separate melting zones for the thermoplastic road marking material: the first melting zone occurring when the thermoplastic particulate passes through the screw conveyor, and the second melting zone occurring when the thermoplastic passes through the conveyor conduits within the melting kettle.

It is yet a further objective of the present invention to provide a heating mechanism coupled to the screw conveyor to provide heating zones that gradually increase temperature of the barrel from the rear where the particulate enters from the hopper, to the front where the molten thermoplastic exits into the air or oil-heated melting kettle.

Still yet a further objective of the present invention is to provide a screw conveyor that utilizes friction to pre-heat or melt at least a portion of the conveyed plastic before entering the air or oil-heat transfer medium melting kettle.

An even further objective of the present invention is to provide a screw conveyor that includes an extrusion type screw configuration within the barrel of the plastic conveyor to propel the thermoplastic forward through the extruder to create friction and heat within the thermoplastic material.

It is a further objective of the instant invention that the rotating screw on the plastic extruder and the auger on the coaxial conduits provide agitation to the thermoplastic material. The agitation allows for proper mixing of the thermoplastic, as well as ensures even disbursement and uniform temperatures throughout the thermoplastic material mass.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 14 is a partial view taken along lines 14-14 of FIG. 2 illustrating a finned outer surface of one embodiment of the conduits.

DETAILED DESCRIPTION OF THE INVENTION

Figure 1:
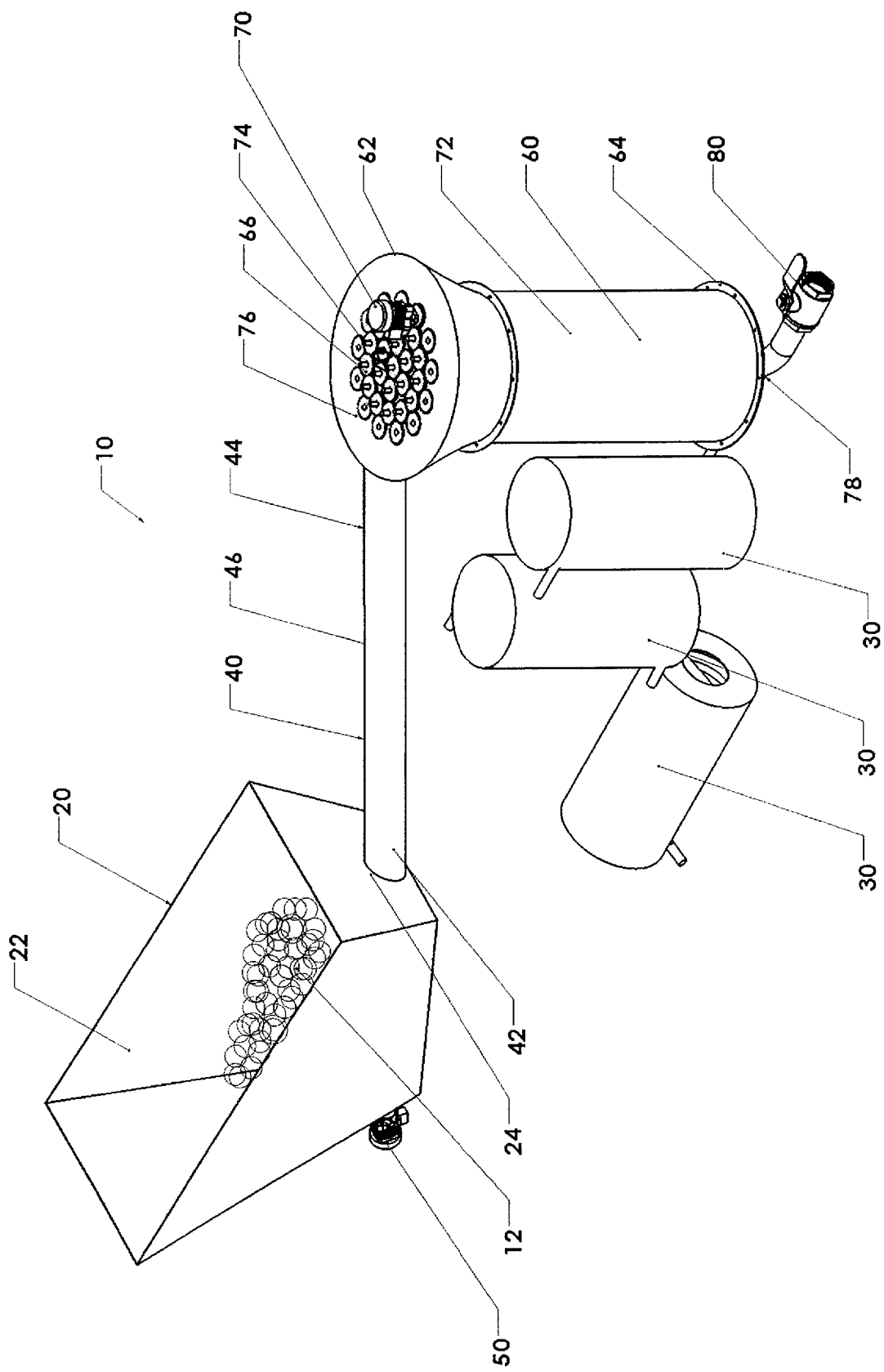
FIG. 1 is a perspective view of the present device.
Figure 2:
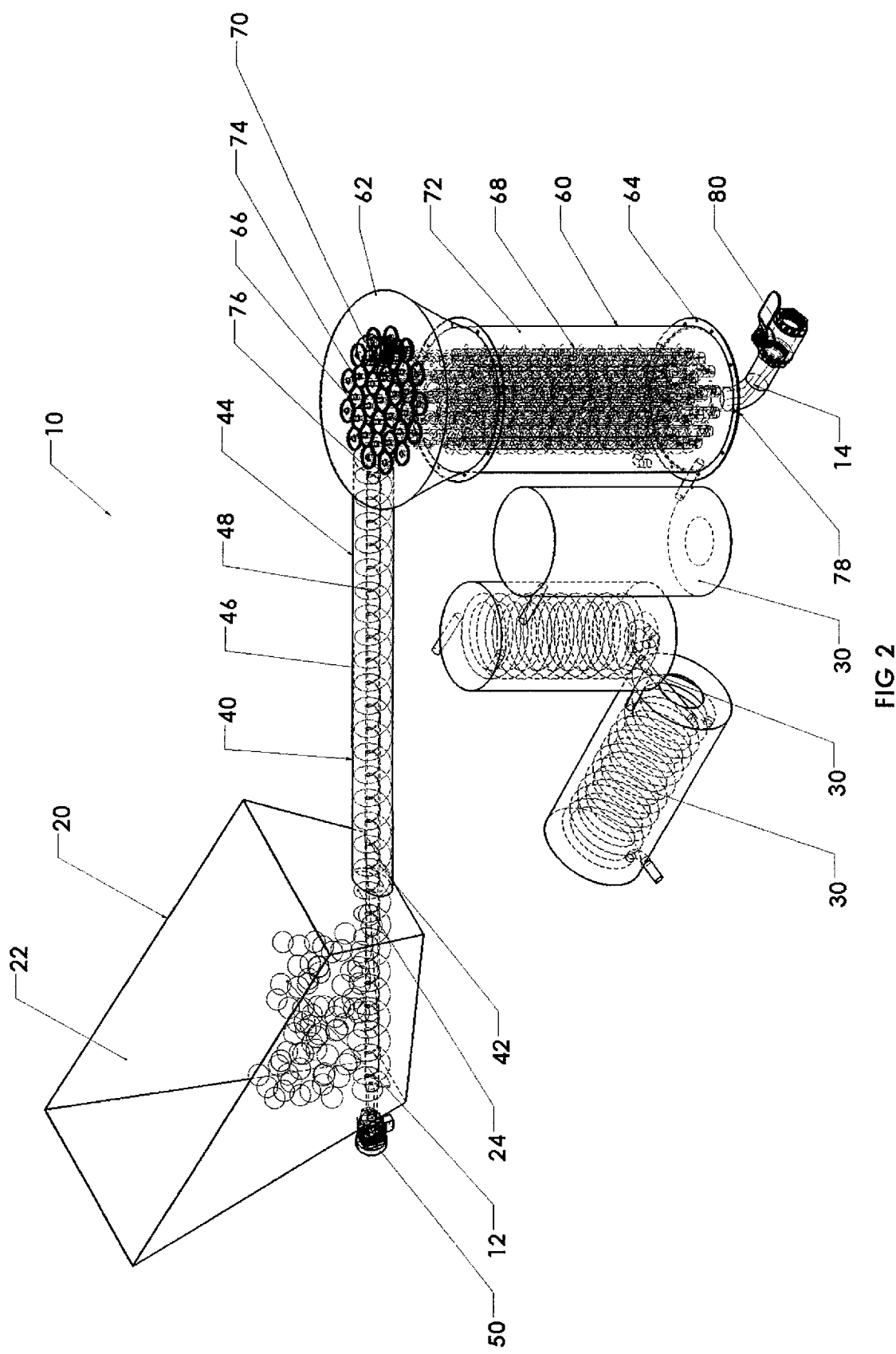
FIG. 2 is a perspective view with portions of the present device illustrated in hidden lines.
Figure 3:
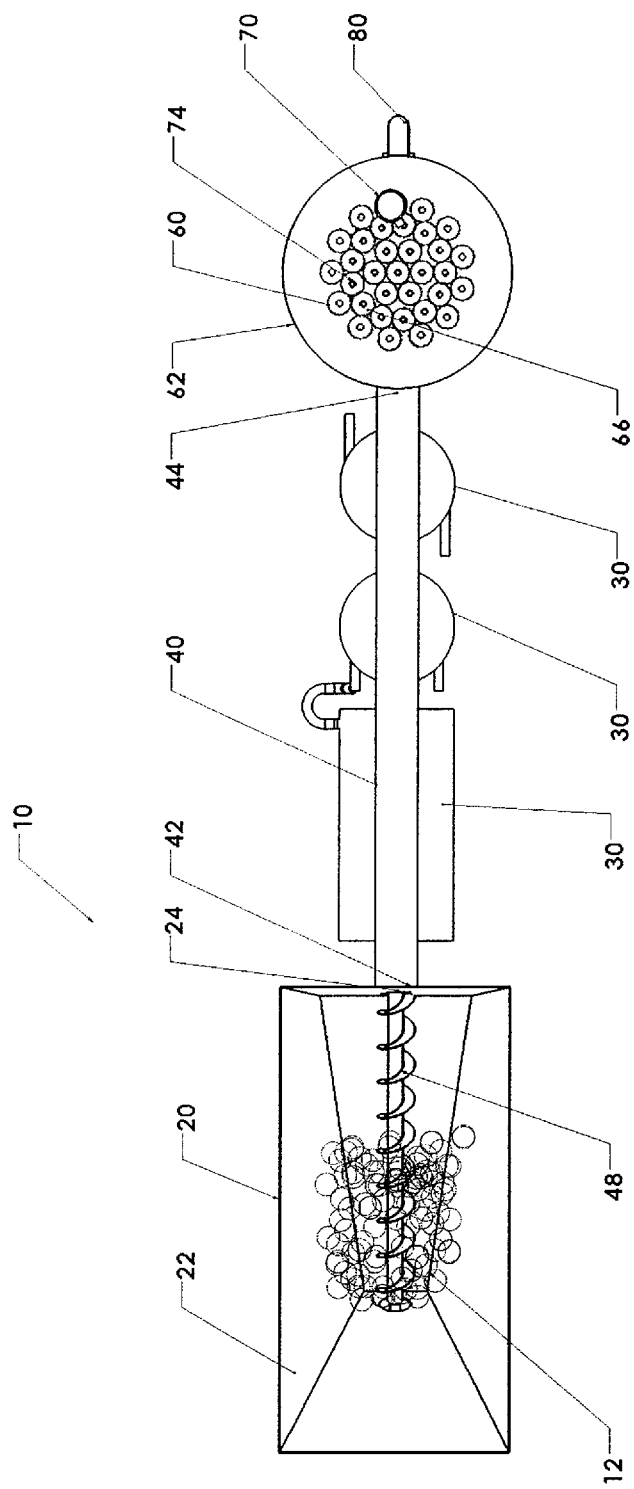
FIG. 3 is a top view of the present device.
Figure 4:
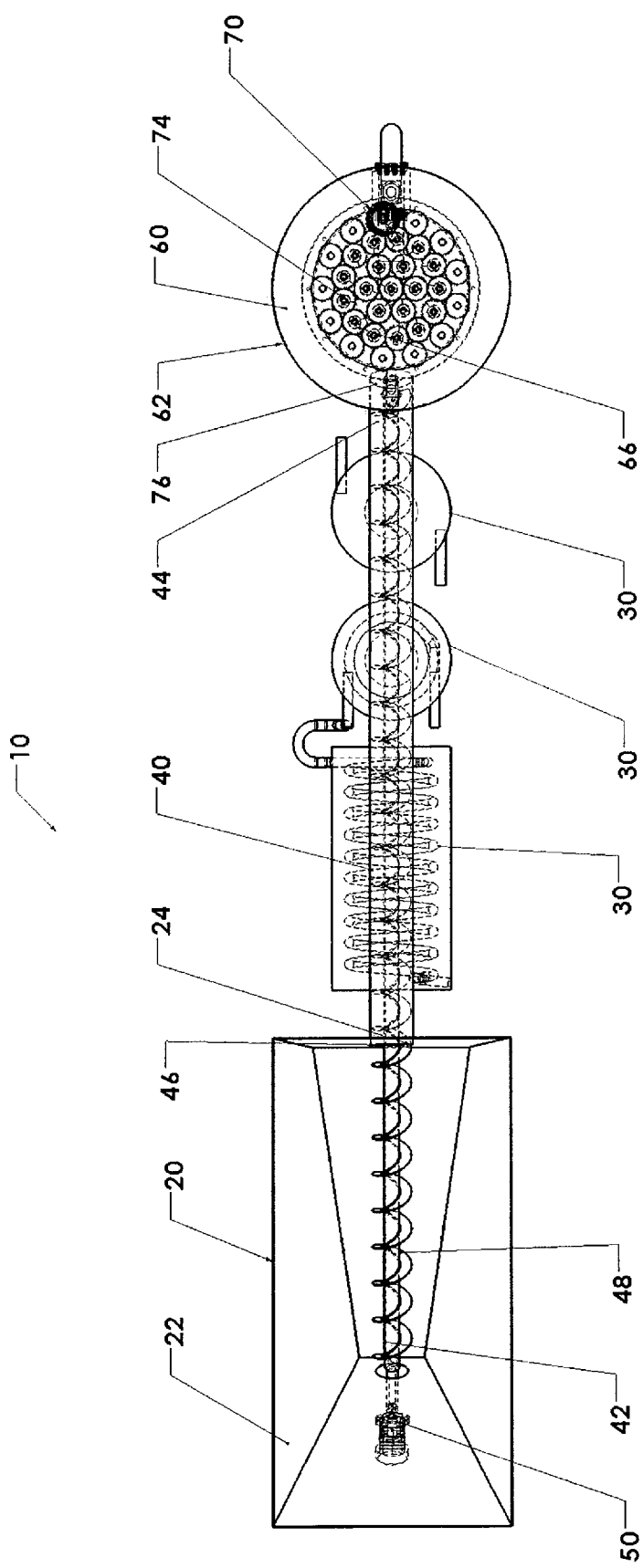
FIG. 4 is a top view of the present device with portions of the present device illustrated in hidden lines.
Figure 5:
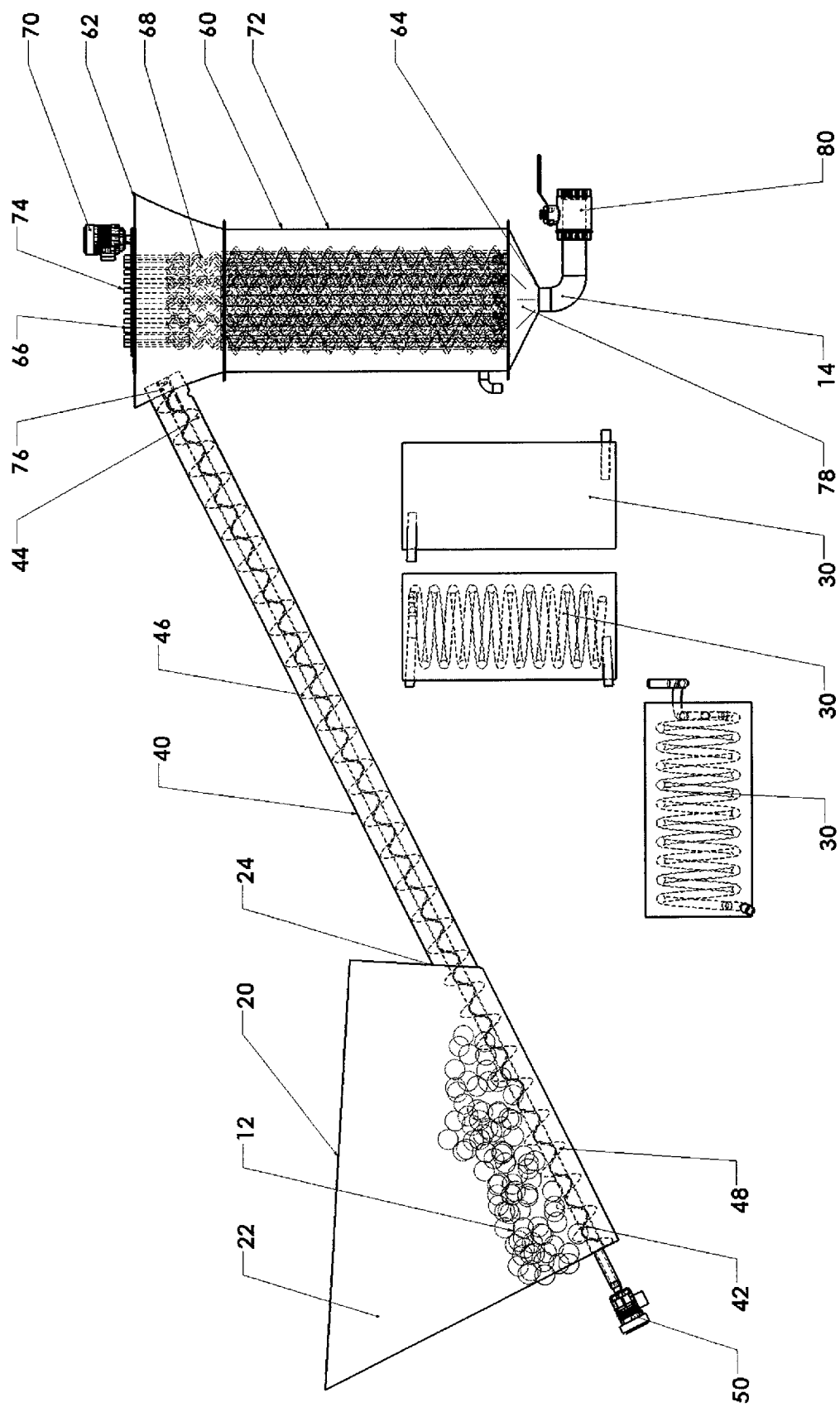
FIG. 5 is a side view of the present device with portions of the present device illustrated in hidden lines.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Now referring to FIGS. 1-14, a pavement striping device 10 for heating and applying thermoplastic material to a road surface is illustrated. The pavement striping device 10 is comprised of: a hopper 20 for holding a supply of particulate thermoplastic marking material 12 in a non-molten state, a screw conveyor 40 for transporting the thermoplastic particulate 12 from the hopper 20 to a single conduit or a series of coaxial conduits 66 within the melting kettle 60 which may be air or oil-heat transfer medium; the melting kettle 60 having at least one and more preferably a series of coaxial conduits 66 therein, a heating mechanism 30 for heating the melting kettle 60 air or oil jacket 61. In at least one embodiment, the screw conveyor 40 may also be heated to a temperature suitable for pre-heating or melting thermoplastic. At least one embodiment includes a drive motor 70 for scraping the sides of the conduits and/or driving the stream of molten thermoplastic 14 through the series of coaxial conduits 66 to a nozzle 80 that directs the molten thermoplastic 14 through an extrusion die (not shown) for sizing and controlling the flow of the molten thermoplastic prior to application on the pavement surface. The pavement striping device 10 may be mounted on a walk behind system, pulled on a trailer, or built on a vehicle chassis without departing from the scope of the invention.

The hopper 20 is a storage container 22 for thermoplastic particulate that is used to dispense particulate through a chute 24 into the screw conveyor 40. The hopper includes an open top suitable for easily pouring pelletized or ground thermoplastic therein. The hopper also preferably includes tapered sidewalls, which direct the granulated or pelletized thermoplastic to the inlet of the screw conveyor. The screw conveyor 40 is comprised of a hollow barrel 46 having a rear end 42 and front end 44, a rotating screw 48, and a screw drive motor 50. The rotating screw 48 is positioned within the barrel 46 of the screw conveyor 40 and driven by the screw drive motor 50. The screw conveyor 40 runs from the chute 24 to the melting kettle 60. In the preferred embodiment, the rear end 42 of the screw conveyor 40 is placed within the hopper 20. Gravity forces the particulate 12 in the hopper 20 downwards into the barrel 46 of the screw conveyor 40 and in contact with the rotating screw 48. Preferably, the amount of particulate 12 that is demanded at the nozzle 80 in real-time is transferred from the hopper 20. In that manner, the screw conveyor may include any number of devices for monitoring the volume of thermoplastic within the melting kettle. These devices would cause the screw conveyor to alternate between feeding material and not feeding material to the melting kettle. The thermoplastic particulate 12 is dispensed from the chute 24 of the hopper 20 and enters the rear end 42 of the screw conveyor 40, therein the particulate 12 comes into contact with the screw 48. The screw 48 forces the particulate 12 forward through the barrel 46, which in at least one embodiment is heated or pre-heated before being deposited in the melting kettle. The thermoplastic exits the front end 44 of the screw conveyor 40 and is fed into the single or series of coaxial conveyor conduits 66 within the air or oil-heat transfer medium melting kettle 60. In some embodiments, rotating screw 48 further acts to scrape the molten plastic from the sidewalls of the conduit(s) and agitate the thermoplastic material as it is forced toward the nozzle 80. Within the embodiments, where the screw conveyor is heated, the screw conveyor 40 is coupled to the heating mechanism 30, which provides hot air or oil to provide the necessary pre-heating to the thermoplastic. The heating mechanism 30 may provide heating zones within the screw conveyor 40 that gradually increase the temperature of the barrel 46 from the rear end 42 to the front end 44. In at least one embodiment, the screw conveyor utilizes a screw such as those utilized in plastic extrusion machines. This screw is constructed and arranged to create heat via friction within the thermoplastic as it is conveyed through the screw conveyor. In this manner, the screw may be constructed to pre-heat or melt the thermoplastic as it is transferred along the conveyor, reducing the heat that would need to be transferred to the thermoplastic for application to a road surface.

Still referring to FIGS. 1-5, the melting kettle 60 is generally capable of melting thermoplastic road marking materials to a suitable temperature to allow flow through the nozzle 80 and extrusion die (not shown). The melting kettle 60 is comprised of a shell 72 of unitized construction to maximize heat efficiency, a ventilation stack 74 to exhaust expanded heat vapor, a material feed door or cover 76 at the top end 62 of the kettle, a material discharge collector 78 at the bottom end 64 of the kettle to rapidly trough molten thermoplastic into the nozzle 80, and at least one, and more preferably a series of coaxial conveyor conduits 66 extending from the top end 62 to the bottom end 64 and in communication with the feed door 76 and discharge valve 80, respectively. The heating mechanism 30 is coupled to the melting kettle 60 in order to maintain a suitable melting temperature. In this manner, air or oil is allowed to circulate around the conduit(s) for heating the outer surface of the conduits for transfer to the thermoplastic material. In at least one embodiment, fins 67 (FIG. 14) are added to the conduits to provide for additional heat transfer to the conduit and thus the stripe material. It should be noted that while the fins 67 are illustrated as horizontally positioned rings in a spaced apart arrangement extending along the length of the tube, other fin arrangements suitable to provide additional heat transfer to the conduit may be utilized without departing from the scope of the invention. Such fins may include, but should not be limited to, cast fins, welded fins, extruded fins, fins attached with epoxy, fins held in place with external frames and the like. In addition, heat transfer pastes and the like may be added between the edges of the fin and the outer diameter of the tube to further enhance heat transfer.

Figure 7:
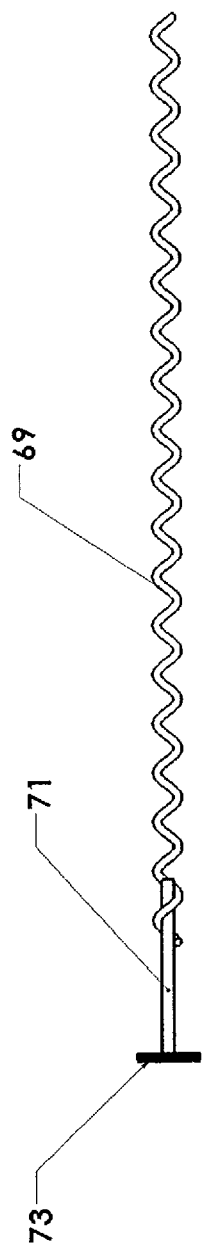
FIG. 7 is a side view of the centerless screw conveyer.
Figure 8:
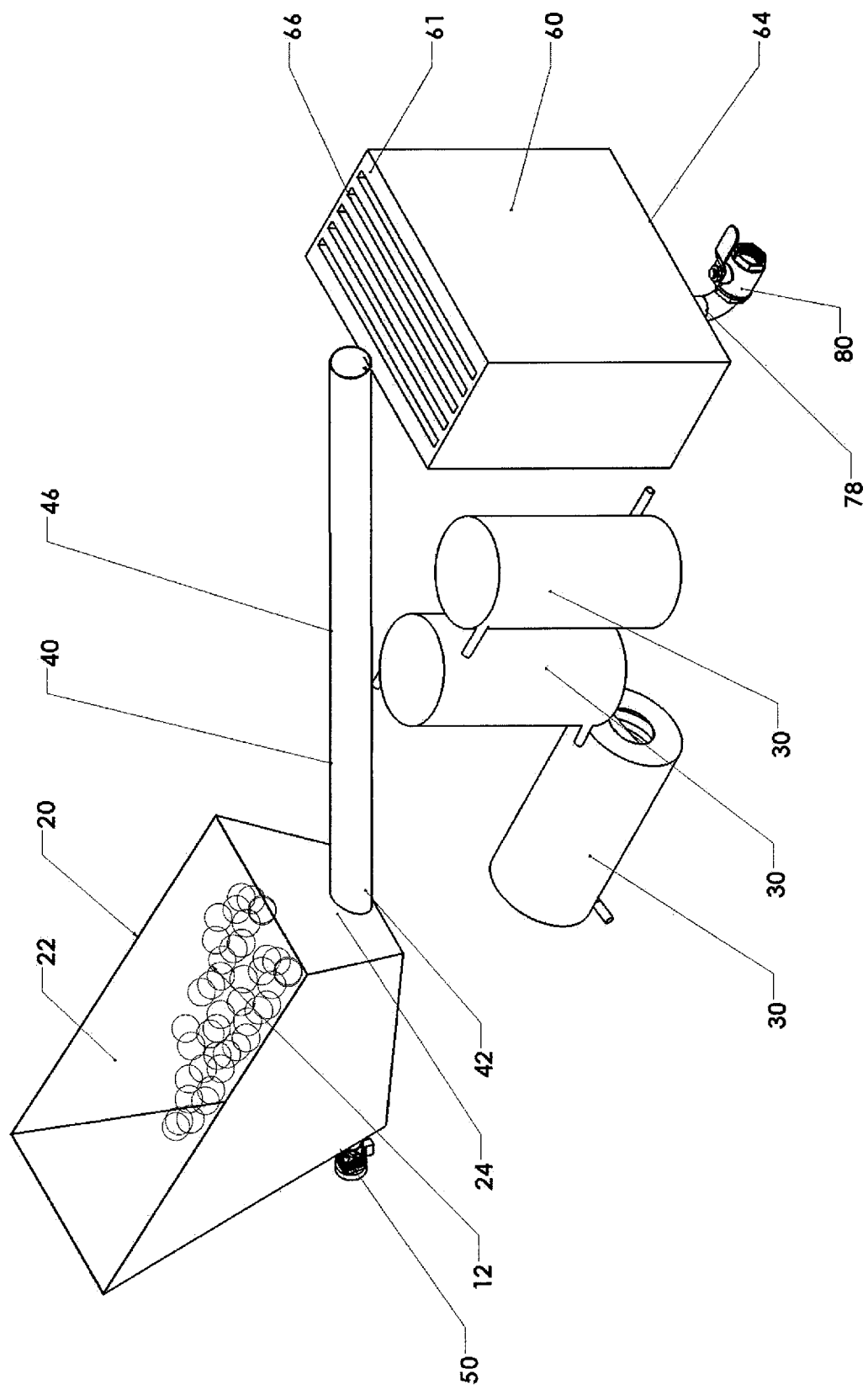
FIG. 8 is a perspective view of an alternative embodiment of the present device.
Figure 9:
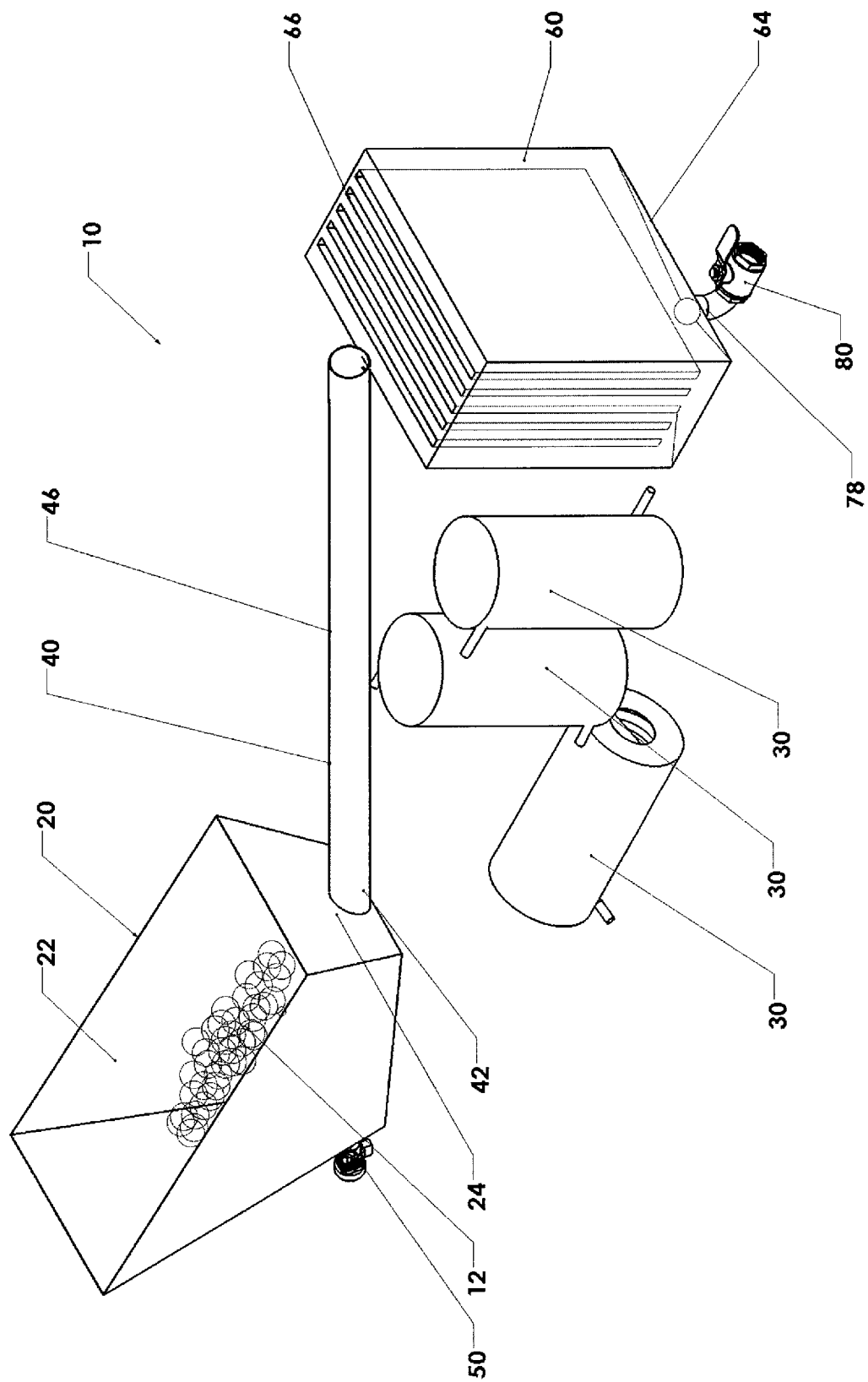
FIG. 9 is a perspective view of the device illustrated in FIG. 8 with portions of the device illustrated in hidden lines.
Figure 10:
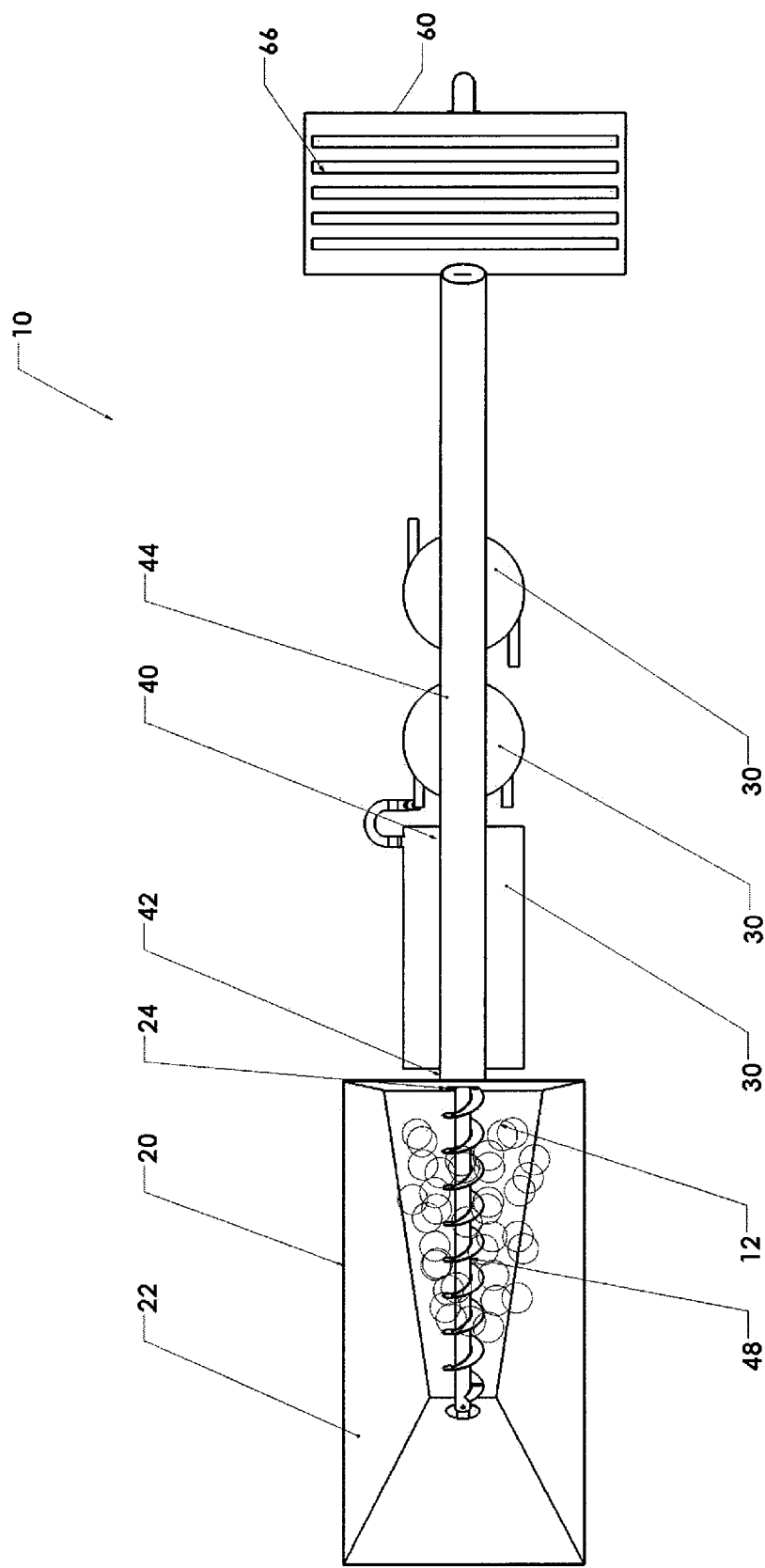
FIG. 10 is a top view of the device illustrated in FIG. 8.
Figure 11:
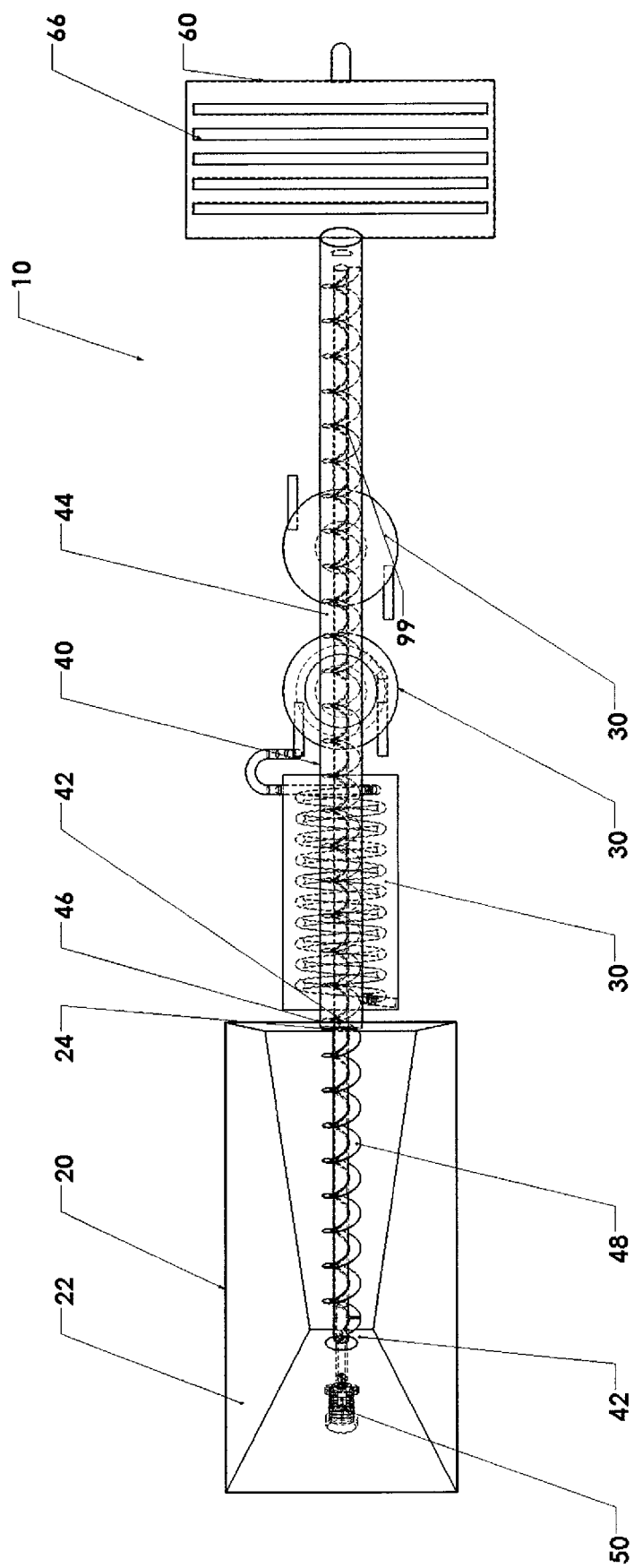
FIG. 11 is a top view of the device illustrated in FIG. 8 with portions of the device illustrated in hidden lines.
Figure 12:
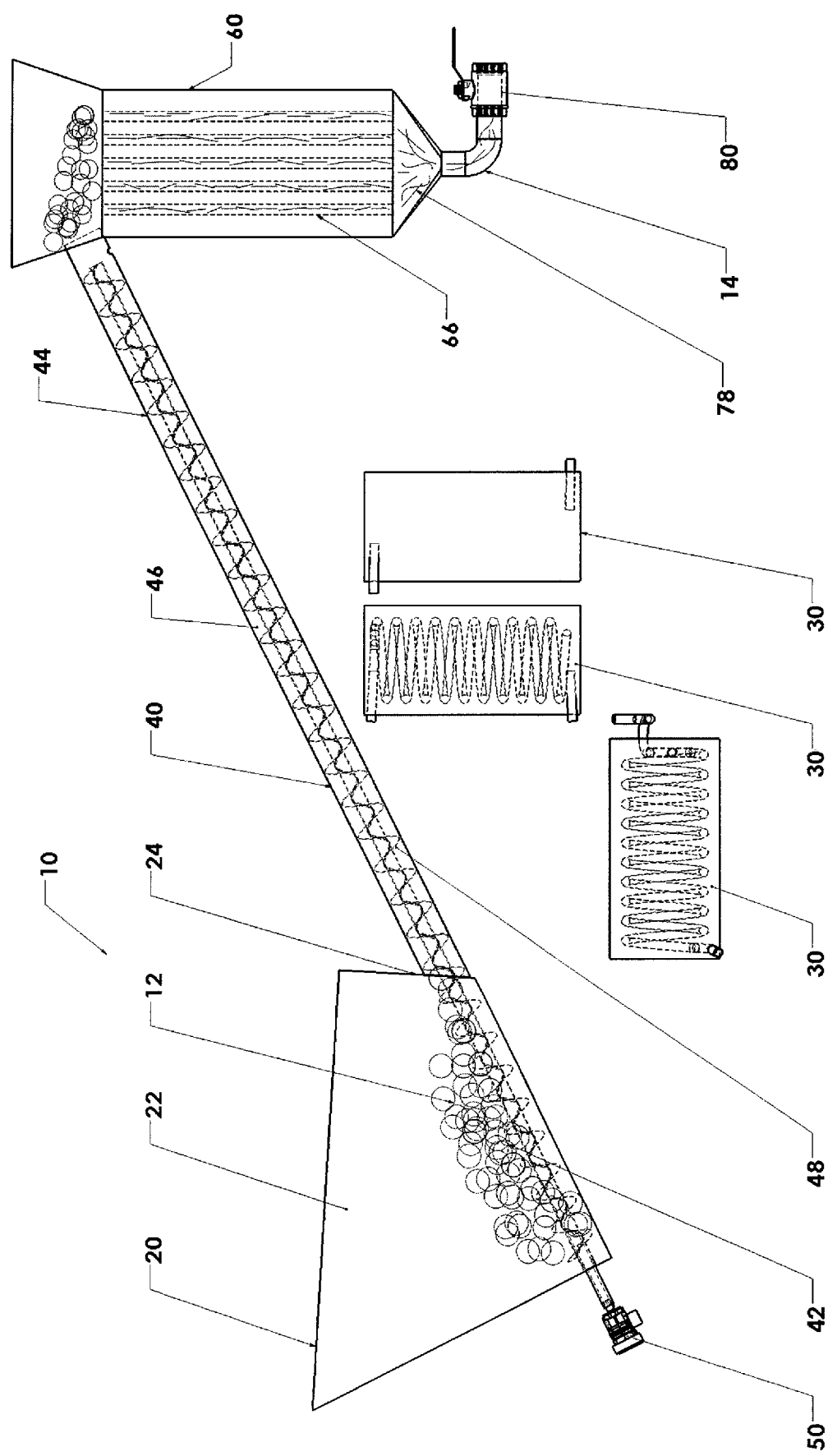
FIG. 12 is a side view of the device illustrated in FIG. 8 with portions of the device illustrated in hidden lines.
Figure 13:
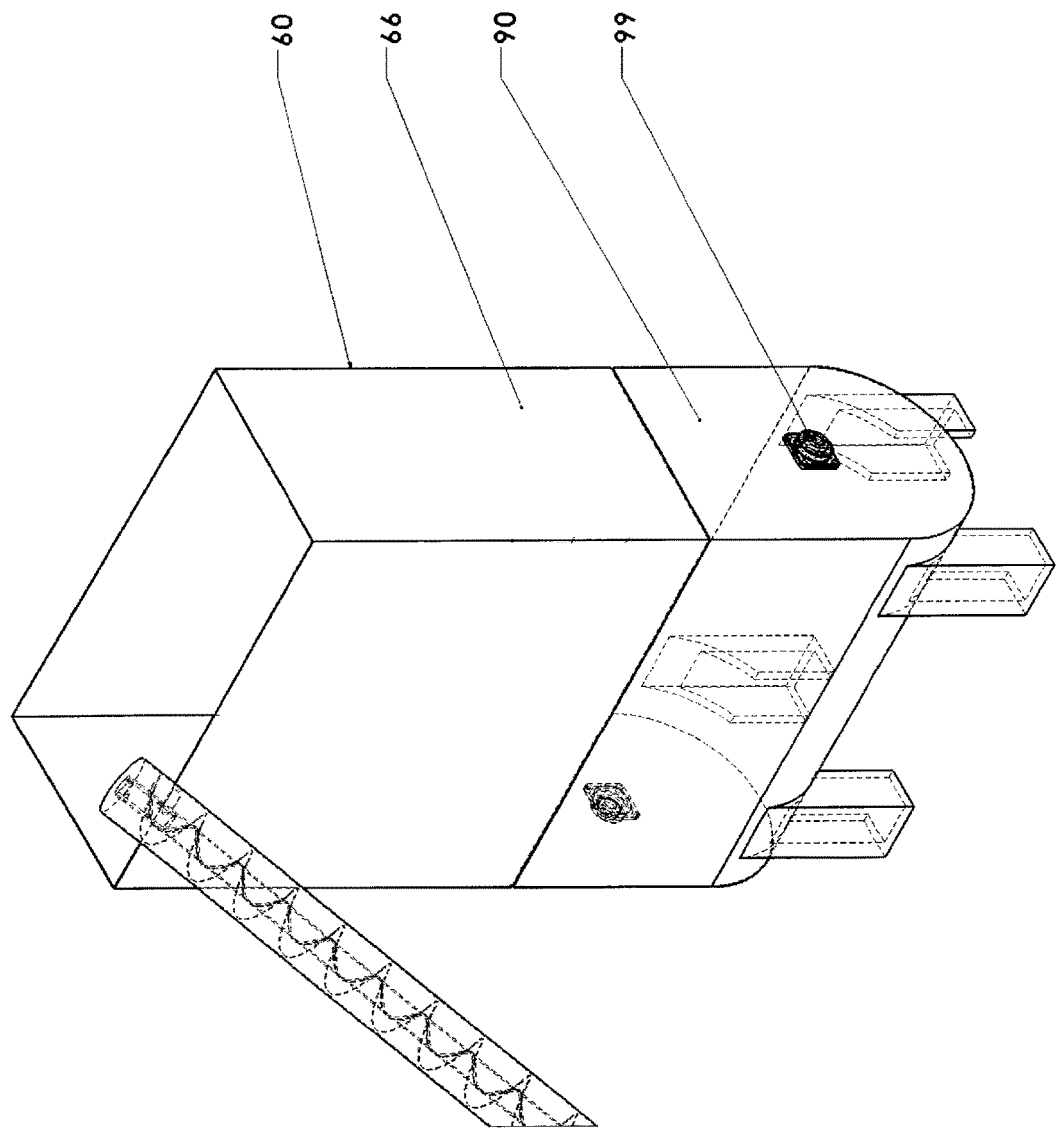
FIG. 13 is a perspective view of one embodiment of the present device.

The single or series of coaxial conduits 66 within the air or oil-heat transfer medium melting kettle 60 are constructed of a material suitable for maintaining a relatively even temperature throughout. The conduits 66 are constructed of a material having a suitable heat transfer coefficient so as to transfer heat from the heated air or oil to the thermoplastic within the melting kettle 60. The temperature should be at least equivalent to the melting temperature of thermoplastic material, in at least one embodiment at least 400 degrees Fahrenheit. Each conduit 66 is equipped with a scraper and/or auger conveyor 68. In a most preferred embodiment, the auger conveyer is a centerless screw conveyor 69 formed from round or semi-round material. In a most preferred embodiment, the auger conveyer is provided in the form of a centerless screw conveyer 69 (FIG. 7). The centerless screw conveyer 69 is formed from a spring or spring like material formed into the helical coil shape. Scrapers or augers having different configurations that are suitable for moving and/or mixing the thermoplastic material may be utilized without departing from the scope of the invention. The auger conveyor 68 is driven by a drive motor 70 that drives thermoplastic material from the top end 62 to the bottom end 64 of the air or oil-heat transfer medium melting kettle 60. The auger conveyor 68 serves to control the speed of transfer of the material as it moves through the conduit 66, as well as directing the plastic to the inner surface of the tubes for heat transfer. It should be noted that the rotating screw 48 on the screw conveyor 40 and the auger/conveyor 68 within each of the coaxial conduits 66 provide agitation to the thermoplastic material. The agitation allows for proper mixing of the thermoplastic, as well as ensures even disbursement and uniform temperatures throughout the thermoplastic material mass. The augers are provided with shafting 71 and gears 73 which allow motor 70 to cause their rotation as desired. In the preferred embodiment, the gears are sized to intermesh with each other where the motor 70 needs to only be connected to one shaft 71 to provide rotation to all of the augers. It should be noted that while an intermeshing gear train is depicted as driving the auger screws within the melting kettle, chains, belts, cables, multiple motors and the like may be utilized to allow rotation of multiple auger screws without departing from the scope of the invention.

The heating mechanism 30 may be connected to the screw conveyor 40 and the melting kettle 60. The heating mechanism 30 is provided with a sensing means 32, not shown, that maintains and monitors the temperature of the kettle 60. In a preferred embodiment, the heating mechanism 30 should provide the kettle 60 with a temperature above 400° F. but not exceeding 600° F. The heating mechanism 30 shall preferably utilize oil as a heat transfer medium, however, hot air or other fluids suitable for transferring the heat without combusting or deteriorating may be utilized without departing from the scope of the invention. The heating mechanism 30 is also provided with a sensing means 32, not shown, that maintains and monitors the temperature within the barrel 46 of the screw conveyor 40, whereby differing heating zones are achieved.

There are various devices that may be attached to the nozzle 80 to apply or contain molten thermoplastic 14 onto the pavement surface such as, but not limited to, a ribbon dispenser, spray dispensing device, screed extrusion device, or the like, not shown. The ribbon dispenser is heated and suspended above the road surface, applying a forced-extrusion, well-defined thermoplastic line. The spray dispensing device shall result in a thermoplastic spray pattern that is a uniformily thick, well-defined, and securely bonded stripe. Compressed air must be dry when mixing with the molten thermoplastic. The screed extrusion device has a dispensing shoe that rides directly on the road surface, and a continuous line is formed by a three-sided die with a control gate set to a pre-determined thickness. An actuation means, not shown, is in electric communication with the screw drive motor 50 on the screw conveyor 40 and the drive motor 70 on the melting kettle 60. The actuation means actuates the motors, 50 and 70, when the sprayer is operated to dispense molten thermoplastic 14. The actuation means allows for real-time melting of the thermoplastic particulate 12 to molten thermoplastic 14 upon trigger of the sprayer means. In this manner, thermoplastic particulate 12 in a non-molten state is transported from a hopper 20 through a screw conveyor 40, whereby the thermoplastic particulate 12 begins a heating process through friction and heating, then the thermoplastic is fed into a series of coaxial conveyored conduits 66 within the air or oil-heat transfer medium melting kettle 60, whereby the thermoplastic is driven therethrough and heated to a suitable melting temperature to form a molten thermoplastic 14. Finally, the molten thermoplastic 14 is pumped through a sprayer means that directs the molten thermoplastic 14 to the pavement surface. The pavement striping device 10 provides two separate melting zones. The first melting zone occurring when the thermoplastic particulate 12 passes through the screw conveyor 40, and the second melting zone occurring when the thermoplastic passes through the conveyor conduits 66 within the melting kettle 60. It should also be noted that while the screw conveyer 40 may be used to preheat the thermoplastic, the melting kettle 60 may be utilized without the screw conveyer without departing from the scope of the invention.

Figure 6:
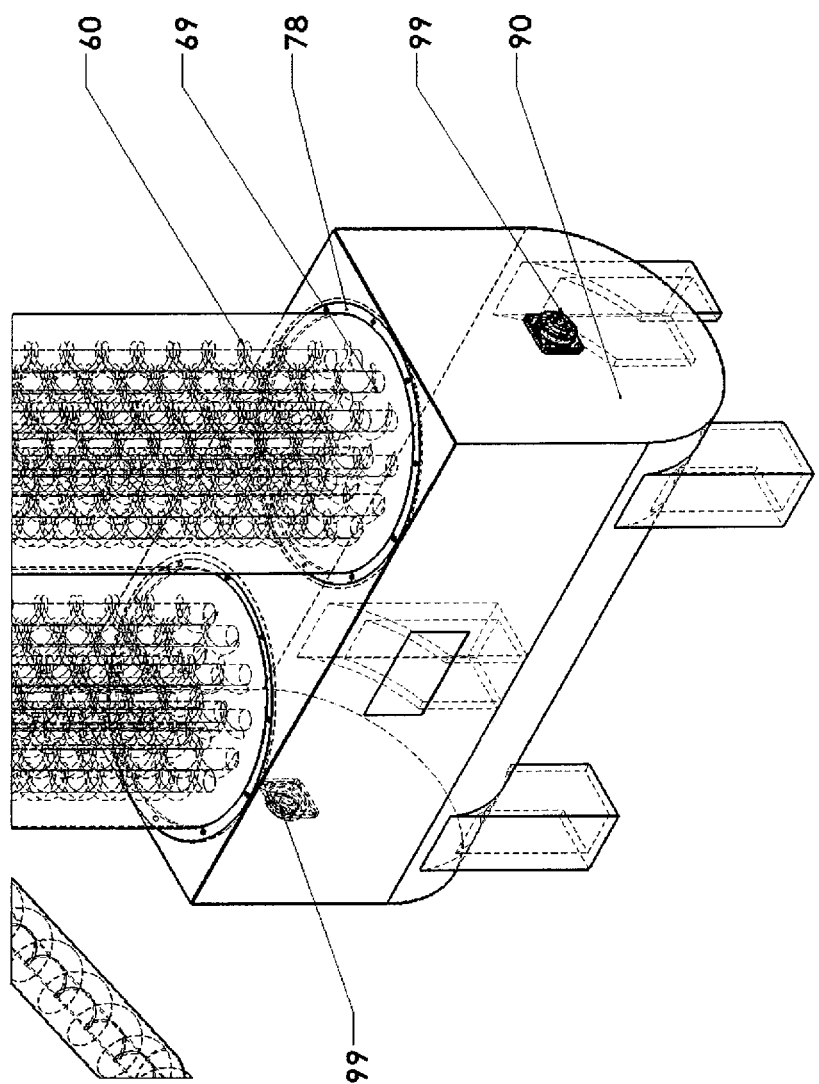
FIG. 6 is a perspective view of an alternative embodiment of the present device.

As shown in FIG. 6, at the bottom end 64 of the melting kettle 60 is a mixing tank 90. The mixing tank 90 can store molten thermoplastic 14 when released from the discharge collector 78 before being moved into the nozzle 80 for spray, not shown. It is contemplated that the mixing tank 90 include a ribbon mixer or the like, not shown. The agitation by the ribbon mixer allows for continuing mixing of the thermoplastic, as well as ensures even disbursement and uniform temperatures throughout the thermoplastic material mass. As shown, constructed into at least one wall or built into at least one wall of the mixing tank is motoring apparatus 94 to power the ribbon mixer 92.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A device for melting thermoplastic marking materials in real time for application to a surface comprising:
   a surface marking assembly, said surface marking assembly including a melting kettle, said melting kettle having a shell, a plurality of conduit members positioned within said shell in a coaxial spaced apart relationship, said plurality of conduit members constructed from a heat conductive material and having an aperture at a first end thereof for accepting thermoplastic granules, a second end of said at least one conduit fluidly connected to a material discharge collector at the bottom end of said kettle for discharging molten thermoplastic;
   a heating system for heating a heat transfer liquid, said heat transfer liquid passed through said melting kettle and around and in direct contact with said plurality of conduit members and inside said shell;
   whereby said thermoplastic granules are passed from said first end of said conduit to said second end of said conduit and are melted before reaching said material discharge collector.

2. The surface marking device for applying thermoplastic marking materials to a surface of claim 1 wherein said plurality of conduit members each include a scraper extending at least partially through said conduit for scraping an inner surface of said conduit and providing agitation to said thermoplastic granules as they are melted.

3. The surface marking device for applying thermoplastic marking materials to a surface of claim 2 wherein said scrapers are connected together for coordinated selective rotation with a single motor.

4. The surface marking device for applying thermoplastic marking materials to a surface of claim 1 including a hopper for holding a supply of said thermoplastic granules in a non-molten state for selective transfer to said plurality of conduit members.

5. The surface marking device for applying thermoplastic marking materials to a surface of claim 4 including a screw conveyor for transporting said thermoplastic granules from said hopper to said plurality of conduit members.

6. The surface marking device for applying thermoplastic marking materials to a surface of claim 1 wherein each said conduit member includes at least one fin for increasing the surface area of the outer surface of each said conduit member thereby increasing heat transfer to said conduit from said heat transfer liquid.

* * * * *